E. D. MARTINET.
COMPOSITION BOARD.
APPLICATION FILED JUNE 24, 1918.
1,333,553. Patented Mar. 9, 1920.
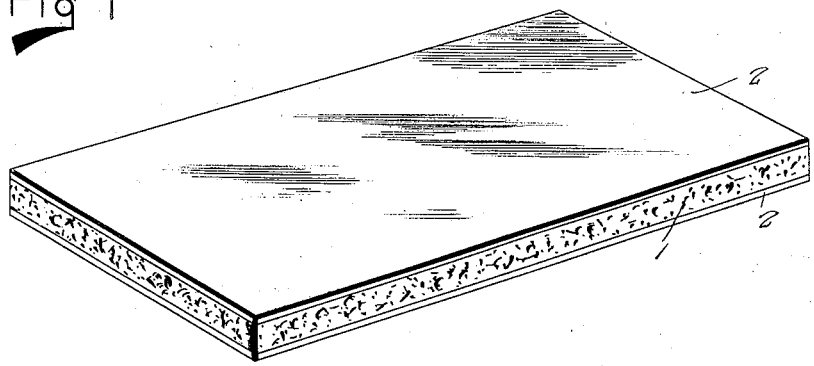
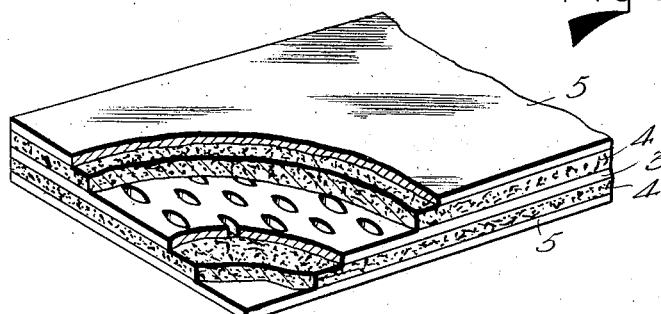
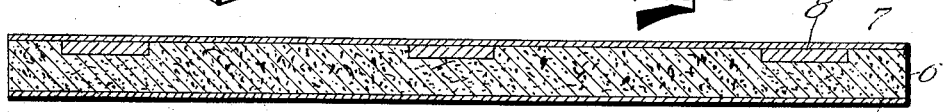
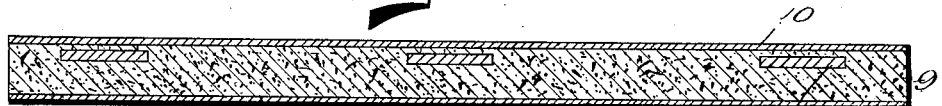
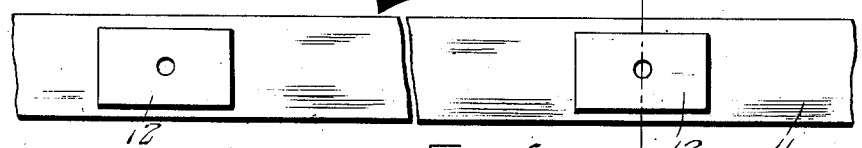
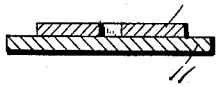
WITNESSES
INVENTOR
Edward D. Martinet
BY
ATTORNEYS

UNITED STATES PATENT OFFICE.

EDWARD D. MARTINET, OF LOS ANGELES, CALIFORNIA.

COMPOSITION BOARD.

1,333,553.   Specification of Letters Patent.   Patented Mar. 9, 1920.

Application filed June 24, 1918. Serial No. 241,580.

*To all whom it may concern:*

Be it known that I, EDWARD D. MARTINET, a citizen of the United States, and a resident of Los Angeles, in the county of Los Angeles and State of California, have invented certain new and useful Improvements in Composition Boards, of which the following is a specification.

My invention is an improvement in composition boards, and has for its object to provide a simple, inexpensive, strong board of the character specified, adapted for either walls or ceilings, wherein the body of the board is composed of a composition, reinforced by strips of pasteboard or the like.

In the drawings:

Figure 1 is a perspective view of a section of the board;

Fig. 2 is a similar view of another embodiment of the invention, with parts broken away;

Fig. 3 is a transverse vertical section of a section of the board;

Fig. 4 is a similar view of another embodiment;

Fig. 5 is a top plan view showing the reinforcing strip and the washers;

Fig. 6 is a section on the line 6—6 of Fig. 5.

In the present embodiment of the invention the improved board is formed from a composition consisting of ordinary building plaster, saw dust, extract of cactus juice, and heavy black molasses, the proportion of the ingredients and the manner of preparing the same being hereinafter described.

In Fig. 1 the improved board consists of a body 1 of the composition, reinforced on its upper and lower surfaces by strips 2 of pasteboard or the like, it being understood that the composition is molded or otherwise formed into the proper shape and that the strips 2 are secured thereto in any suitable or desired manner.

In Fig. 2 the improved board is composed of a central strip 3 of pasteboard or the like, lateral layers 4 of composition, and external strips 5 of pasteboard, the said strips being at the outer faces of the composition.

If desired, the improved board may be reinforced with strips of material extending longitudinally thereof in the body of the composition. As shown in Fig. 3, the board consists of the central layer 6 of composition and facing strips 7 of pasteboard or the like, and within the layer 6 is arranged a series, three in the present instance, of strips 8 of wood or the like, the said strips being at the center and near the edges of the board and extending the full length thereof. Nails used in holding the board may be driven through the strips 8.

In Figs. 4, 5 and 6 is shown another arrangement, wherein the board is composed of the central layer 9 of composition, and the facing strips 10 of pasteboard or the like, and pasteboard strips 11 are arranged within the body of the composition layer in the same manner as the strips 8 are arranged in the layer 6. At intervals of approximately eight inches washers 12 of metal, as, for instance, tin or sheet metal, are laid upon the strip, each washer being in the form of a plate having a central opening, and through these openings nails may be driven to hold the board in place. This type of board is especially adapted for ceilings, while the boards shown in Figs. 1 and 2 are more especially adapted for wall constructions. The metal washer and the wooden strip prevent the nails from coming through the plaster.

I claim:

A composition board composed of a body or inner layer of composition, molded to shape and having reinforcing facings of pasteboard on its opposite faces, pasteboard strips embedded therein at intervals, and metal washers on the pasteboard strips, said washers having openings for the passage of securing means and being adapted to prevent said securing means drawing through the board.

EDWARD D. MARTINET.

Witnesses:
 KEARNEY S. FISHER,
 OSWIN E. MOYER.